United States Patent
Watanabe et al.

(10) Patent No.: US 7,576,652 B2
(45) Date of Patent: Aug. 18, 2009

(54) METHOD AND APPARATUS FOR ESTIMATING A POSITION OF DETECTED GOODS AND CONTROLLING MOVEMENT/SWINGING OF AN RFID READER IN RESPONSE TO THE ESTIMATED POSITION OF THE GOODS

(75) Inventors: Satoru Watanabe, Kawasaki (JP); Tatsuro Matsumoto, Kawasaki (JP); Masayuki Fukui, Kawasaki (JP); Eiichi Takahashi, Kawasaki (JP); Kazuo Sasaki, Kawasaki (JP); Ai Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 11/645,676

(22) Filed: Dec. 27, 2006

(65) Prior Publication Data

US 2007/0194921 A1 Aug. 23, 2007

(30) Foreign Application Priority Data

Feb. 16, 2006 (JP) ............................. 2006-039814

(51) Int. Cl.
*G08B 13/14* (2006.01)
(52) U.S. Cl. .................... 340/572.1; 340/10.1
(58) Field of Classification Search ............ 340/572.1, 340/10.1, 572.8, 568.1; 235/375, 487
See application file for complete search history.

(56) References Cited

U.S. PATENT DOCUMENTS

2008/0036602 A1* 2/2008 Mullins .................... 340/572.2
2008/0136639 A1* 6/2008 Deoalikar et al. ........ 340/572.1

FOREIGN PATENT DOCUMENTS

| JP | 2003-327331 A | 11/2003 |
| JP | 2004-85400 A | 3/2004 |
| JP | 2004-88346 A | 3/2004 |
| JP | 2004-94556 A | 3/2004 |

* cited by examiner

*Primary Examiner*—Jeffery Hofsass
(74) *Attorney, Agent, or Firm*—Westerman, Hattori, Daniels & Adrian, LLP.

(57) ABSTRACT

Information is stored in an RFID provided to a goods conveyed by a conveying apparatus and from which information is readable in a noncontact manner. A presence detection sensor that detects the presence of the goods conveyed by the conveying apparatus; a reader that reads the information stored in the RFID in the noncontact manner; a moving apparatus that moves the reader; and a control apparatus that controls the operation of the moving apparatus are provided in a system. The control apparatus presumes the presence position, where the goods is present, on the conveying apparatus based on the detection value of the presence detection sensor, and controls the operation of the moving apparatus so that the reader stays, for a predetermined time, in a space where the reader can read the information from the RFID that is present in the presumed presence position.

20 Claims, 11 Drawing Sheets

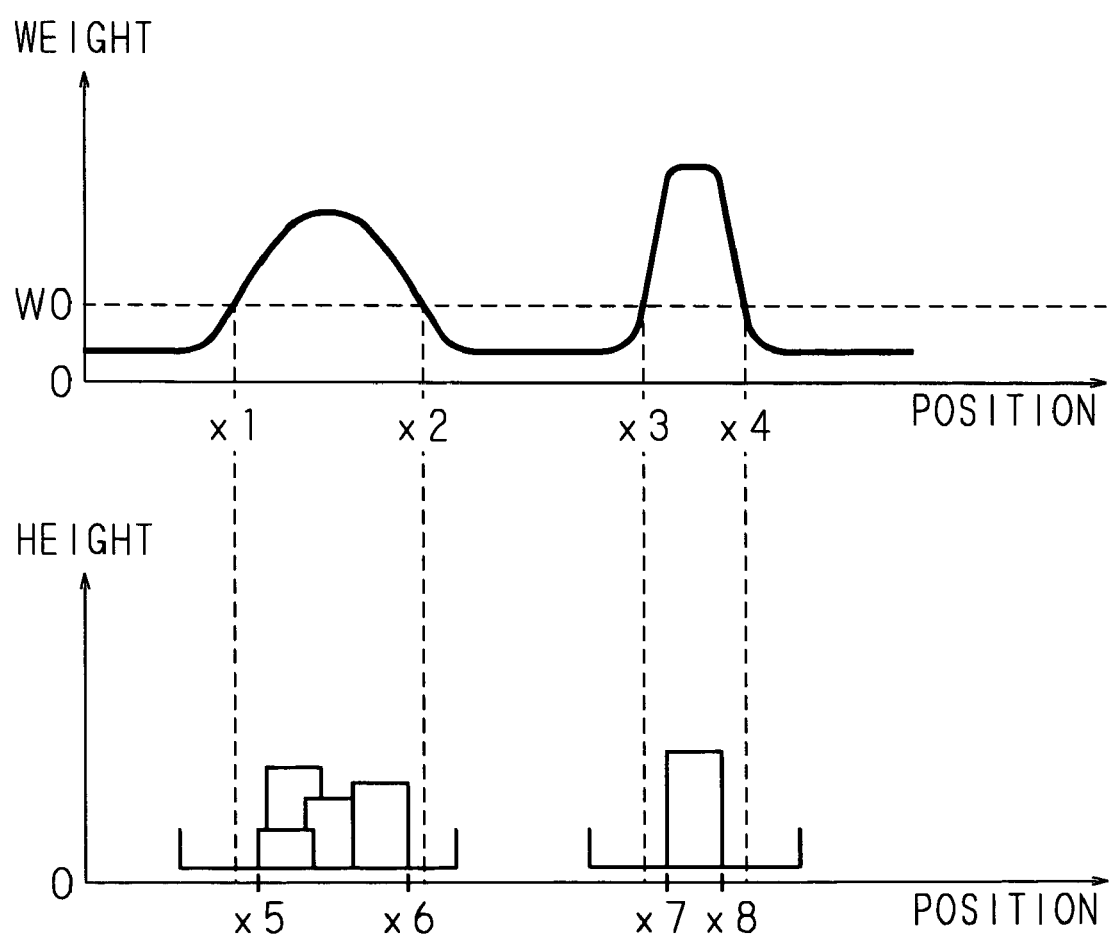
F I G. 7

METHOD AND APPARATUS FOR ESTIMATING A POSITION OF DETECTED GOODS AND CONTROLLING MOVEMENT/SWINGING OF AN RFID READER IN RESPONSE TO THE ESTIMATED POSITION OF THE GOODS

CROSS-REFERENCE TO RELATED APPLICATIONS

This Nonprovisional application claims priority under 35 U.S.C. §119(a) on Patent Application No. 2006-039814 filed in Japan on Feb. 16, 2006, the entire contents of which are hereby incorporated by reference.

BACKGROUND OF THE INVENTION

1. Field of the Invention

The present invention relates to an RFID (Radio Frequency IDentification) reading method capable of detecting, without omission, the presence of the RFIDs provided to goods conveyed by a conveying apparatus. Moreover, the present invention relates to an RFID reading system and a control apparatus for carrying out such an RFID reading method, and a computer program product for such control apparatus.

2. Description of Related Art

In recent years, RFID media such as noncontact type IC tags to and from which information is writable and readable in a noncontact manner have sprung into wide use. For example, by conveying a goods or the like in a state of being provided with a noncontact type RFID medium, it is enabled to read the information recorded on the noncontact type RFID medium by a reader/writer provided exterior and inspect the goods or the like based on the read information.

However, when the reader/writer reads the information from the noncontact type RFID medium, it is necessary that the noncontact type RFID medium and the reader/writer are present within a predetermined distance for a predetermined time or longer. In particular, in a case where the goods or the like provided with the noncontact type RFID medium is being moved by a conveying apparatus such as a conveyor, whether the presence of the noncontact type RFID medium can be detected with reliability or not is an important technical problem.

Conventionally, in order that the presence of the noncontact type RFID medium can be reliably detected even when the goods or the like provided with the noncontact type RFID medium is being moved by a conveying apparatus such as a conveyor, the conveyance speed of the conveyor or the like is reduced at the time of the detection. For example, by reducing the conveyance speed of a forklift which is normally 133 meters per minute, to 30 meters per minute at the time of the inspection, the time for reading the information stored in the noncontact type RFID medium by the reader/writer is secured. This results in a reduction of the overall conveyance efficiency because the inspection speed becomes a bottleneck.

To solve such a problem, for example, Japanese Patent Application Laid-Open No. 2004-094556 discloses an inspecting apparatus capable of, only when the presence of the noncontact type RFID medium cannot be detected by a normal detection gate where the reader/writer is placed, detecting the presence of the noncontact type RFID medium again by another reader/writer by leading the goods or the like to a different path. According to this prior art, the presence of the noncontact type RFID medium can be more reliably detected without any reduction in the conveyance speed of the goods or the like.

Moreover, Japanese Patent Application Laid-Open No. 2004-085400 discloses an IC product inspecting apparatus in which the reader/writer moves in synchronism with the speed at which the IC product provided with the noncontact type RFID medium is conveyed. According to this prior art, information can be read without any reduction in the conveyance speed of the goods or the like with similar accuracy to when the information stored in the noncontact type RFID medium is read with the reader/writer being stopped.

BRIEF SUMMARY OF THE INVENTION

However, in the inspecting apparatus disclosed in Japanese Patent Application Laid-Open No. 2004-094556, it is necessary that the number of conveyance paths be more than one as well as the number of readers/writers. Consequently, the installation space is increased, and the manufacturing cost is increased. In addition, since the conveyance speed is constant, it is not assured that the information stored in the noncontact type RFID medium from which information cannot be read by the first reader/writer can be always read by the second reader/writer, and the improvement in detection accuracy is limited. That is, since a noncontact type RFID medium situated behind another noncontact type RFID medium can be present depending on the installation positions of the readers/writers, the stored information cannot be read even when the reading of the information is tried over and over again by the readers/writers.

On the other hand, in the IC product inspecting apparatus disclosed in Japanese Patent Application Laid-Open No. 2004-085400, since the reader/writer is moved in synchronism with the conveyance speed of the IC product, the above-mentioned problem does not arise. However, since it is necessary to provide a reader/writer for each goods to be inspected in the inspection area, a multiplicity of readers/writers are necessary. In addition, since it is necessary to move the reader/writer to the last in synchronism with the goods to be inspected while the goods to be inspected is being conveyed within the inspection area, it is necessary to uselessly move the reader/writer after it has detected the noncontact type RFID medium. This makes it difficult to reduce the power consumption involved in the movement of the reader/writer.

The present invention is made in view of the above mentioned circumstances, and an object thereof is to provide an RFID reading method, an RFID reading system, a control apparatus and a computer program capable of detecting, without omission, the presence of an RFID medium provided to a goods conveyed by a conveying apparatus.

To attain the above-mentioned object, a first aspect of an RFID reading method according to the present invention is an RFID reading method for reading information stored in an RFID by a reader that is provided so as to be movable, and reads, in a noncontact manner, information stored in the RFID provided to a goods conveyed by a conveying apparatus. The method is characterized by comprising the steps of: presuming a presence position, where the goods is present, on the conveying apparatus based on a detection value of a presence detection sensor that detects presence of the goods conveyed by the conveying apparatus; and controlling a movement of the reader so that the reader stays, for a predetermined time, in a space where the reader can read the information from the RFID that is present in the presumed presence position.

Moreover, a first aspect of an RFID reading system according to the present invention is an RFID reading system that reads information stored in an RFID provided to a goods conveyed by a conveying apparatus and from which information is readable in a noncontact manner. The system is characterized by including: a presence detection sensor that detects presence of the goods being conveyed by the conveying apparatus; a reader that reads the information stored in the RFID in the noncontact manner; a moving apparatus that moves the reader; and a control apparatus that controls an operation of the moving apparatus; wherein the control apparatus comprises: position presuming means for presuming a presence position where the goods is present, based on a detection value of the presence detection sensor; and means for transmitting a signal to control the operation of the moving apparatus so that the reader stays, for a predetermined time, in a space where the reader can read the information from the RFID that is present in the presence position presumed by the position presuming means.

Further, a first aspect of a control apparatus according to the present invention is a control apparatus that controls reading of information stored in an RFID provided to a goods conveyed substantially at a constant speed on a conveying apparatus and from which information is readable in a noncontact manner. The control apparatus is characterized by comprising: position presuming means for presuming a presence position where the goods is present, based on a detection value of a presence detection sensor that detects presence of the goods conveyed by the conveying apparatus; and means for transmitting a signal to control an operation of a moving apparatus that moves the reader so that the reader stays, for a predetermined time, in a space where the reader can read the information from the RFID that is present in the presence position presumed by the position presuming means.

Further, a first aspect of a computer program product according to the present invention is a computer program product for controlling a computer so as to read, by using a reader, information stored in an RFID provided to a goods conveyed substantially at a constant speed on a conveying apparatus and from which information is readable in a noncontact manner. The computer program product is characterized by comprising: a computer readable storage medium having computer readable program code means embodied in the medium, the computer readable program code means comprising the computer instruction means for: presuming a presence position, where the goods is present, on the conveying apparatus, based on a detection value of a presence detection sensor that detects presence of the goods conveyed by the conveying apparatus; and transmitting a signal to control an operation of a moving apparatus that moves the reader so that the reader stays, for a predetermined time, in a space where the reader can read the information from the RFID that is present in the presumed presence position.

Moreover, a second aspect of an RFID reading method according to the present invention is, in the method of the first aspect, characterized in that, in the step of controlling the movement of the reader, the reader is moved in a conveyance direction of the goods so as to stay, for the predetermined time, in the space where the reader can read the information from the RFID that is present in the presence position.

Moreover, a second aspect of an RFID reading system according to the present invention is, in the system of the first aspect, characterized in that the moving apparatus moves the reader in a conveyance direction of the goods, and the control apparatus transmits a signal to move the moving apparatus in the conveyance direction of the goods so that the reader stays, for the predetermined time, in the space where the reader can read the information from the RFID that is present in the presence position.

Further, a second aspect of a control apparatus according to the present invention is, in the control apparatus of the first aspect, characterized in that the moving apparatus moves the reader in a conveyance direction of the goods, and the control apparatus transmits a signal to move the moving apparatus in the conveyance direction of the goods so that the reader stays, for the predetermined time, in the space where the reader can read the information from the RFID that is present in the presence position.

Further, a second aspect of a computer program product according to the present invention is, in the computer program product of the second aspect, characterized in that the moving apparatus moves the reader in the conveyance direction of the goods, and the signal provides an instruction to move the moving apparatus in the conveyance direction of the goods so that the reader stays, for a predetermined time, in the space where the reader can read the information from the RFID that is present in the presence position.

Moreover, a third aspect of an RFID reading method according to the present invention is an RFID reading method for reading information stored in an RFID by a reader that is provided so as to be swingable in a vertical direction and/or a conveyance direction of the goods, and reads, in a noncontact manner, information stored in the RFID provided to a goods conveyed by a conveying apparatus. The method is characterized in that the reader has directivity in information reading, and by comprising the steps of: presuming a presence position, where the goods is present, on the conveying apparatus based on a detection value of a presence detection sensor that detects presence of the goods conveyed by the conveying apparatus; and controlling swinging of the reader so that a direction where the reader can read the information from the RFID present in the presumed presence position and a direction of the directivity of the reader substantially coincide with each other.

Moreover, a third aspect of an RFID reading system according to the present invention is an RFID reading system that reads information stored in an RFID provided to a goods conveyed by a conveying apparatus and from which information is readable in a noncontact manner. The system is characterized by including: a presence detection sensor that detects presence of the goods being conveyed by the conveying apparatus; a reader that reads the information stored in the RFID in the noncontact manner; a swinging mechanism that swings the reader in a vertical direction and/or a conveyance direction of the goods; and a control apparatus that controls an operation of the swinging mechanism, wherein the reader has directivity in information reading, and the control apparatus comprises: position presuming means for presuming a presence position where the goods is present, based on a detection value of the presence detection sensor; and means for transmitting a signal to control the operation of the swinging mechanism so that a direction where the reader can read the information from the RFID that is present in the presence position presumed by the position presuming means and a direction of the directivity of the reader substantially coincide with each other.

Further, a third aspect of a control apparatus according to the present invention is a control apparatus that controls reading of information stored in an RFID provided to a goods conveyed substantially at a constant speed on a conveying apparatus and from which information is readable in a noncontact manner. The control apparatus is characterized by comprising: means for presuming a presence position where the goods is present, based on a detection value of a presence detection sensor that detects presence of the goods conveyed by the conveying apparatus; and position presuming means for transmitting a signal to control an operation of a swinging mechanism that swings a reader, having directivity in information reading, in a vertical direction and/or a conveyance direction of the goods so that a direction of the directivity of the reader is orientated, for a predetermined time, in a direction where the reader can read the information from the RFID that is present in the presence position presumed by the position presuming means.

Further, a third aspect of a computer program product according to the present invention is a computer program product for controlling a computer to read, by using a reader having directivity in information reading, information stored in an RFID provided to a goods conveyed substantially at a constant speed on a conveying apparatus, from which information is readable in a noncontact manner. The computer program product is characterized by comprising: a computer readable storage medium having computer readable program code means embodied in the medium, the computer readable program code means comprising the computer instruction means for: presuming a presence position, where the goods is present, on the conveying apparatus, based on a detection value of a presence detection sensor that detects presence of the goods conveyed by the conveying apparatus; and transmitting a signal to control an operation of a swinging mechanism that swings the reader in a vertical direction and/or a conveyance direction of the goods so that a direction of the directivity of the reader is orientated, for a predetermined time, in a direction where the reader can read the information from the RFID that is present in the presumed presence position.

Moreover, a fourth aspect of an RFID reading method according to the present invention is, in the method of the second or third aspect, characterized by further comprising the step of limiting the presumed presence position based on an image picked up by an image pick-up device that picks up an image of a conveyance state of the goods.

Moreover, a fourth aspect of an RFID reading system according to the present invention is, in the system of the second or third aspect, characterized by further including: an image pick-up device that picks up an image of a conveyance state of the goods; and means for limiting the presence position presumed by the position presuming means, based on the image picked up by the image pick-up device.

Further, a third aspect of a control apparatus according to the present invention is, in the control apparatus of the second or third aspect, characterized by further comprising means for limiting the presence position presumed by the position presuming means, based on an image picked up by an image pick-up device that picks up an image of a conveyance state of the goods.

Further, a third aspect of a computer program product according to the present invention is, in the computer program product of the second or third aspect, characterized in that the computer readable program code means further comprises the computer instruction means for limiting the presumed presence position based on an image picked up by an image pick-up device that picks up an image of a conveyance state of the goods.

In the first and the second aspects of the present invention, the reader that reads, in the noncontact manner, the information stored in the RFID provided to the goods conveyed by the conveying apparatus is provided so as to be movable in the conveyance direction of the goods. The presence position where the goods is present is presumed based on the detection value of the presence detection sensor that detects the presence of the goods conveyed by the conveying apparatus, and the movement of the reader is controlled so that the reader stays, for the predetermined time, in the space where the reader can read the information from the RFID that is present in the presumed presence position. Thereby, the reader stays only for the predetermined time in the space where the reader can read the information stored in the RFID to be read, and, at the point of time when the information is read, can move to the space where the reader can read the information stored in the next RFID. Consequently, the information stored in the plural RFIDs can be reliably read without the need to provide the reader for each RFID to be conveyed. Moreover, when the information stored in the RFID is read, the reader can immediately shift to the reading of the information stored in the next RFID. As a result, it is unnecessary to uselessly move the reader and the power consumption involved in the movement of the reader can be reduced.

In the third aspect of the present invention, the reader that reads, in the noncontact manner, the information stored in the RFID provided to the goods conveyed by the conveying apparatus is provided so as to be swingable in the vertical direction and/or the conveyance direction of the goods. Further, the reader has directivity in information reading in the third aspect. Accordingly, the presence position where the goods is present is presumed based on the detection value of the presence detection sensor that detects the presence of the goods conveyed by the conveying apparatus, and the swinging of the reader is controlled so that the direction of the directivity of the reader is orientated, for a predetermined time, in the direction where the reader can read the information from the RFID that is present in the presumed presence position. By swinging the reader in this manner, the direction of the directivity of the reader can be set, for the predetermined time, to the direction where the reader can read the information stored in the RFID to be read, so that, at the point of time when the information is read, the orientation of the reader can be changed to the direction where the reader can read the information stored in the next RFID. As a result, the information stored in the plural RFIDs can be reliably read without the need to provide the reader for each RFID to be conveyed. Moreover, when the information stored in the RFID is read, the reader can immediately shift to the reading of the information stored in the next RFID. Consequently, it is unnecessary to uselessly swing the reader and the power consumption involved in the swinging of the reader can be reduced.

In the fourth aspect of the present invention, the presumed presence position of the goods is further limited based on the image of the conveyance state of the goods picked up by the image pick-up device.

The above and further objects and features of the invention will more fully be apparent from the following detailed description with accompanying drawings.

BRIEF DESCRIPTION OF THE SEVERAL VIEWS OF THE DRAWINGS

FIG. 7 is an explanatory view of the method to limit the presence positions of the goods in the RFID reading system according to Embodiment 23;

DETAILED DESCRIPTION OF THE PRESENT INVENTION

Hereinafter, the present invention will be described based on the drawings showing embodiments thereof. In the embodiments shown below, a case where the goods conveying apparatus is a conveyor will be described as an example. It is to be noted that the conveying apparatus is not limited thereto and may be a different conveying apparatus such as a forklift or a truck.

EMBODIMENT 1

Figure 1:
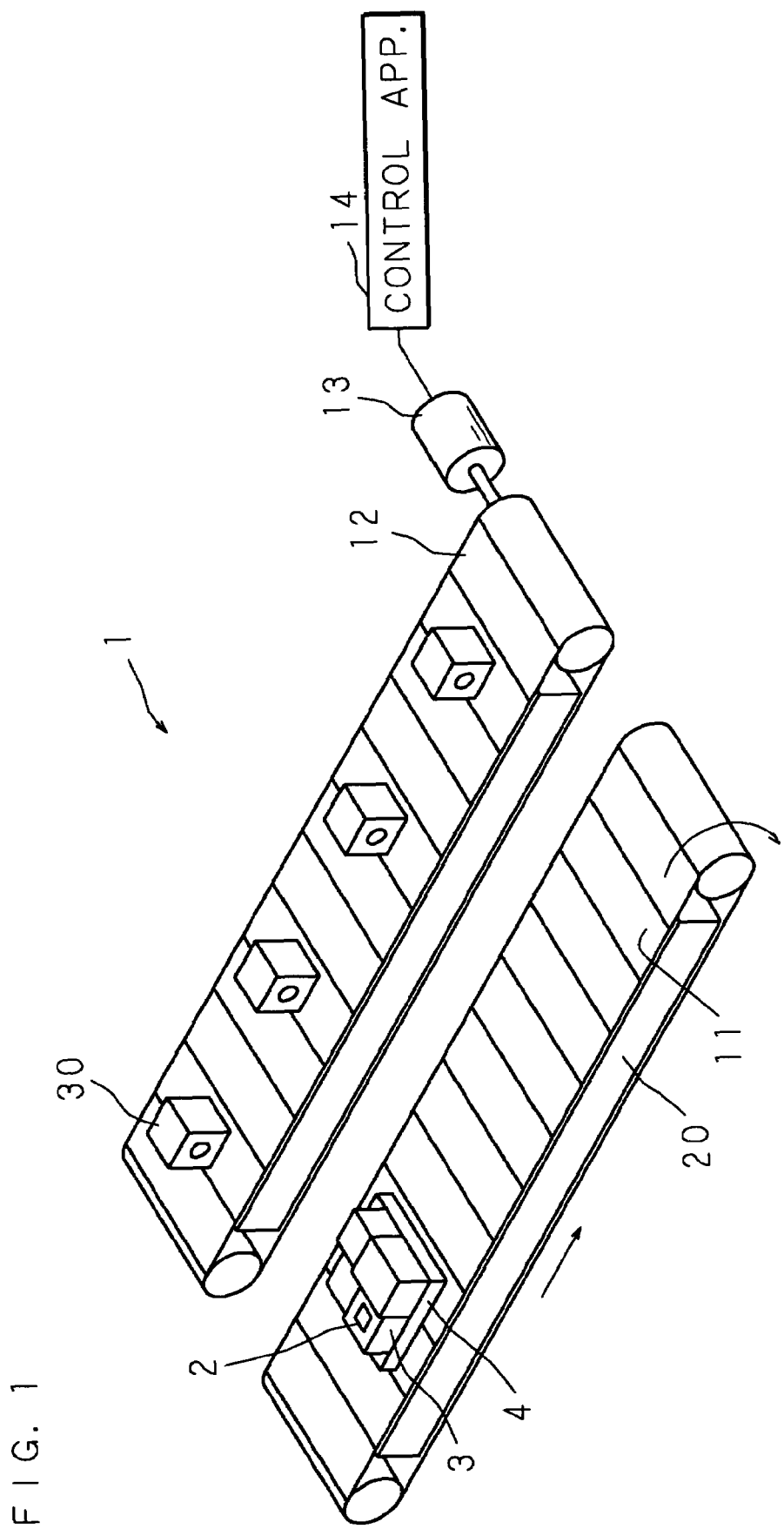
FIG. 1 is a schematic view showing a configuration of an RFID reading system according to Embodiment 1 of the present invention.

FIG. 1 is a schematic view showing a configuration of an RFID reading system according to Embodiment 1 of the present invention.

In FIG. 1, a conveying apparatus 1 is provided with: a first conveyor 11 that, under a state where goods 3 are placed on a tray 4, conveys goods 3 provided with RFID media 2 capable of performing data communication in a noncontact manner; and a weight measuring device 20 functioning as a presence detecting sensor for measuring the weights of the goods 3 being conveyed on the first conveyor 11. The weight measuring device 20 is provided inside the first conveyor 11 which is the conveyance path of the goods 3, and is capable of detecting, substantially in real time, the weight distribution of the goods and the like conveyed on the first conveyor 11 according to the positions on the first conveyor 11. That is, it is capable of detecting that the goods are present in the positions at which weights are equal to or larger than a predetermined value are detected.

In the conveying apparatus 1, on one side of the first conveyor 11, a second conveyor 12 is disposed so as to run in parallel with the first conveyor 11. Onto the second conveyor 12, readers/writers (readers) 30 capable of performing communication with RFID media 2 are fixed substantially at equal intervals. The readers/writers 30 are capable of detecting whether a predetermined goods is conveyed or not by performing data communication with the RFID media 2 provided to the goods 3 being conveyed on the first conveyor 11. When the presence of the RFID medium 2 provided to the predetermined goods is detected by the readers/writers 30, the readers/writers 30 transmits, for example by radio communication, a signal representing that the RFID medium 2 is detected, to a control apparatus 14 that controls the operation of a servo motor (moving means) 13 as the driving source of the second conveyor 12.

The control apparatus 14 obtains the information for identifying the conveyed goods, from an external computer such as a computer that manages data of an inspection system, a quality control system or the like, and determines whether the goods is conveyed or not based on the signal received from the readers/writers 30. When the goods to be conveyed is not detected, the control apparatus 14 transmits a signal to provide an instruction to reduce the conveyance speed, that is, the rotation speed of the servo motor 13, to the servo motor 13 so that the readers/writers 30 stay in the positions opposed to the goods 3 for a long time.

Figure 2:
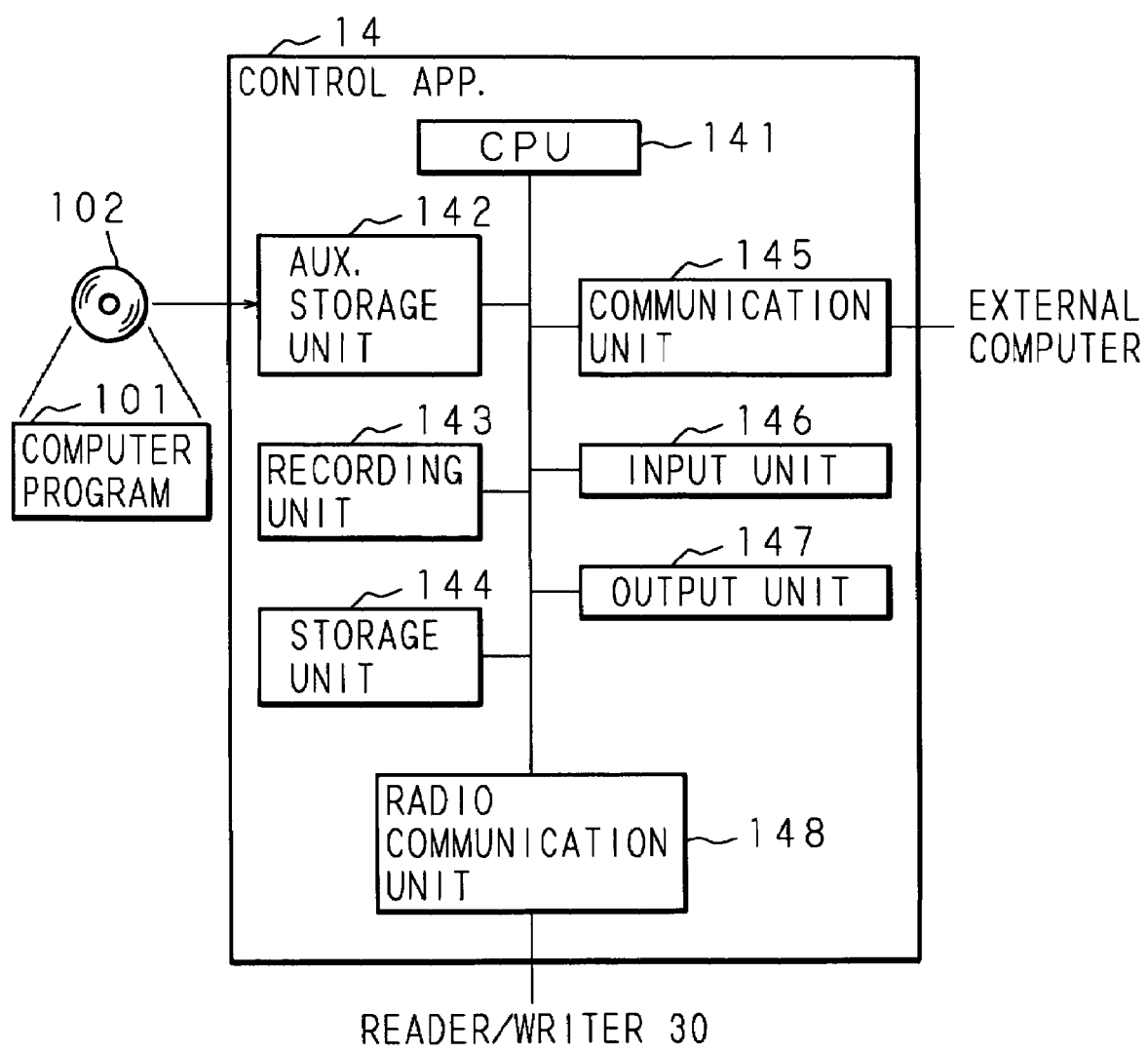
FIG. 2 is a block diagram showing a configuration of a control apparatus of the RFID reading system according to Embodiment 1 of the present invention.

FIG. 2 is a block diagram showing a configuration of the control apparatus 14 of the RFID reading system according to Embodiment 1 of the present invention.

As shown in FIG. 2, the control apparatus 14 is provided with: a CPU 141 that controls the entire apparatus; an auxiliary storage unit 142 such as a CD-ROM drive that reads various pieces of information from a recording medium 102 such as a CD-ROM in which various pieces of information such as a computer program 101 executable by the control apparatus 1 according to Embodiment 1 of the present invention and data are recorded; and a recording unit 143 such as a hard disk in which various pieces of information read by the auxiliary storage unit 142 are recorded. By reading various pieces of information such as the computer program 101 according to the present invention and data from the recording unit 143, storing them in a storage unit 144 such as a RAM temporarily storing information, and performing various procedures contained in the computer program 101 by the CPU 141, the computer operates as the control apparatus 1 according to the present invention. The control apparatus 1 is further provided with: a communication unit 145 that performs data communication with an external computer; an input unit 146 such as a mouse, a keyboard, and the like; and a output unit 147 such as a monitor, a printer, and the like. The control apparatus 14 is also provided with a radio communication unit 148 that receives the information read through the readers/writers 30 through radio communication.

Figure 3:
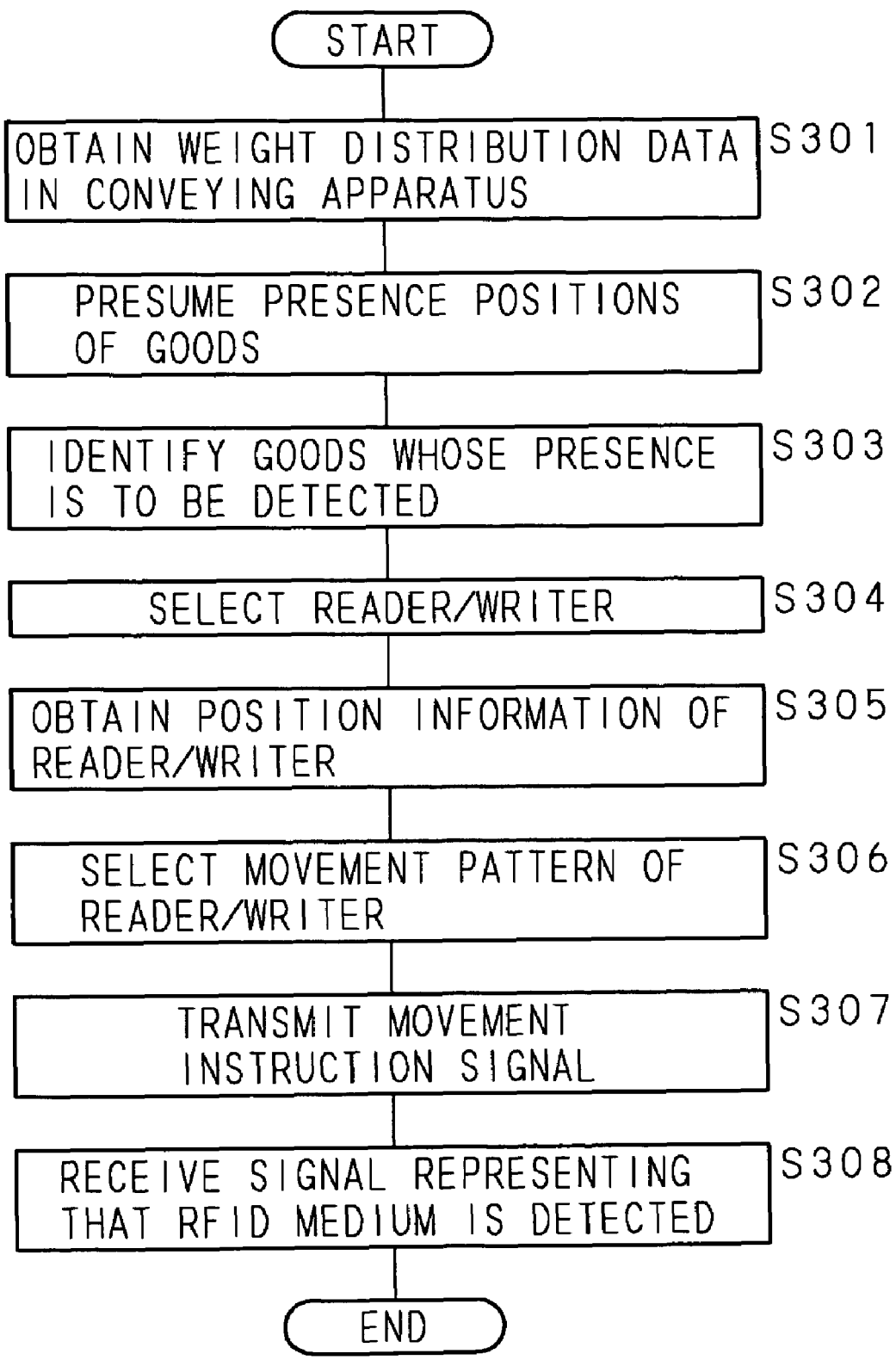
FIG. 3 is a flowchart showing a processing procedure of a CPU of the control apparatus of the RFID reading system according to Embodiment 1 of the present invention.

The operation of the RFID reading system using the control apparatus 14 of the above-described configuration will be described. FIG. 3 is a flowchart showing a processing procedure of the CPU 141 of the control apparatus 14 of the RFID reading system according to Embodiment 1 of the present invention.

Figure 4:
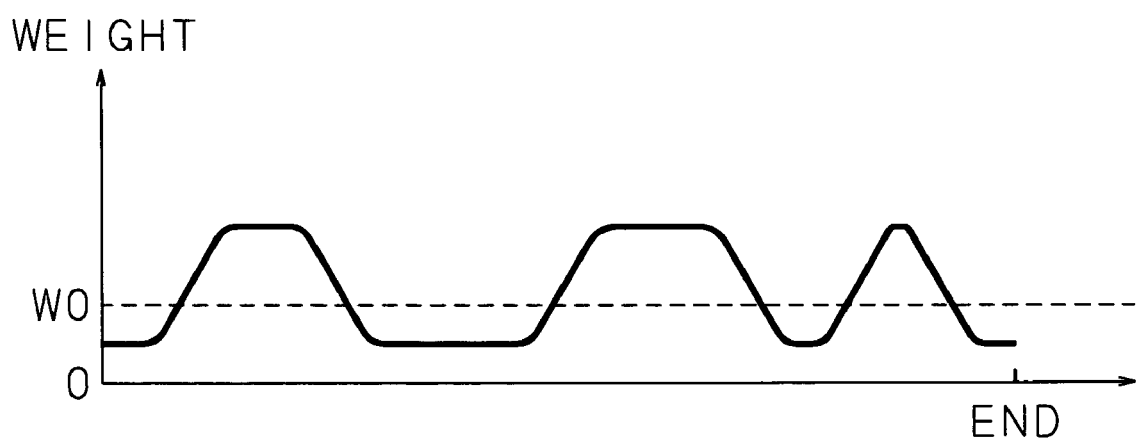
FIG. 4 is a view showing an example of the weight distribution data at a predetermined point of time.

First, the CPU 141 of the control apparatus 14 obtains the weight distribution data in the conveying apparatus 1 based on the weights detected by the weight measuring device 20 functioning as the presence detecting sensor (step S301). Specifically, with the goods conveyance start point of the first conveyor 11 as the origin, the weight distribution data to the goods conveyance end position is obtained. FIG. 4 is a view showing an example of the weight distribution data at an optional point of time. The CPU 141 obtains the weight distribution on the first conveyor 11 at an optional point of time as shown in FIG. 4.

The CPU 141 presumes the presence positions of the goods 3 based on the obtained weight distribution data (step S302). Specifically, the CPU 141 calculates the average value W0 of the weight distribution data shown in FIG. 4, and presumes portions of the weights larger than the average value W0 to be the presence positions of the goods 3. It is to be noted that the present invention is not limited to the average value W0 and any method may be adopted that is capable of presuming the positions where the goods 3 are likely present.

The CPU 141 identifies the goods 3 whose presence is to be detected (step S303), selects the reader/writer 30 nearest to the position where the identified goods 3 is present, for each goods 3 (step S304), and obtains the position information of the selected reader/writer 30 (step S305). Selected is the reader/writer 30 whose position on the second conveyor 12 disposed parallel to the first conveyor 11 is nearest to the position where the goods 3 is present with the goods conveyance start position of the first conveyor 11 as the origin. The CPU 141 selects the movement pattern such as the movement speed and the movement direction of the reader/writer 30 based on the presence position of the goods 3, the conveyance speed, and the position of the reader/writer 30 (step S306).

The CPU 141 transmits a movement instruction signal based on the selected movement pattern to the servo motor 13 (step S307), and receives a signal representing that the RFID medium 2 is detected, from the reader/writer 30 (step S308).

The method to select the movement pattern such as the movement speed and the movement direction of the reader/writer 30 by the CPU is not specifically limited. For example, when the movement speed, the movement direction and the like of the reader/writer 30 are changed along the direction in which the goods 3 are conveyed by the first conveyor 11, the CPU 141 obtains the conveyance speed and the conveyance direction of the goods 3, and identifies the direction in which the reader/writer 30 moves to a space where it can communicate with the RFID medium 2 provided to the goods 3, based on the position of the selected reader/writer 30 and the obtained presence position of the goods 3. Then, the CPU 141 transmits a movement instruction signal to the servo motor 13 according to the movement pattern selected from among the preset movement patterns.

The movement pattern is previously selected from among, for example, a pattern such that the reader/writer 30 is moved at the maximum speed to the front end, in the conveyance direction, of the presence position of the goods 3 to be detected and reads the RFID medium 2 in a stopped state and a pattern such that the reader/writer 30 is moved at the maximum speed to the front end, in the conveyance direction, of the presence position of the goods 3 to be detected and reads the RFID medium 2 while being moved in the conveyance direction at a speed slightly lower than the conveyance speed of the goods 3. When a multiplicity of goods are placed one on another on the first conveyor 11, the latter movement pattern is selected to prolong the time for detecting the RFID medium 2.

In the conventional RFID reading system, it is necessary to move the reader/writer 30 in synchronism with the conveyance speed of the goods. However, in Embodiment 1, as mentioned above, it is unnecessary that the movement speed of the reader/writer 30 coincide with the conveyance speed of the goods as long as the reader/writer 30 stays within the space where data communication with the RFID medium 2 is possible. A movement pattern such that the movement speed is changed so that the moving distance of the reader/writer 30 becomes shortest according to the degree of distribution of the RFID media 2, stacked state of the goods and the degree of distribution on the first conveyor 11 may be stored so as to be an object of selection.

The CPU 141 determines whether the reading of the RFID media 2 is completed or not. The method to determine whether the reading of the RFID media 2 is completed or not is not specifically limited, either. For example, whether the reading of the RFID media 2 is finished or not may be determined by obtaining the information on the number of RFID media 2 storing the information to be read by the reader/writer 30, from an inspection management computer placed exterior to inspect the goods 3 and determining whether a predetermined number of pieces of detection information are read from the RFID media 2 by the reader/writer 30 or not. It is to be noted that the identification information of the RFID media 2 to be present may be obtained so that the determination is made based on whether the identification information is read or not.

As described above, according to Embodiment 1, the reader/writer 30 stays only for a predetermined time in the space where the information stored in the RFID medium 2 to be read is readable, and, at the point of time when the information is read, can move to the space where the information stored in the next RFID medium 2 is readable. Consequently, the information stored in the RFID medium 2 can be reliably read without the need to provide the reader/writer 30 for each of the RFID media 2 provided to the goods 3 to be conveyed. Moreover, when the information stored in the RFID medium 2 can be read, the shift to the reading of the information stored in the next RFID medium 2 can be immediately made, so that it is unnecessary to uselessly move the reader/writer 30 and the power consumption involved in the movement of the reader/writer 30 can be reduced.

EMBODIMENT 2

Figure 5:
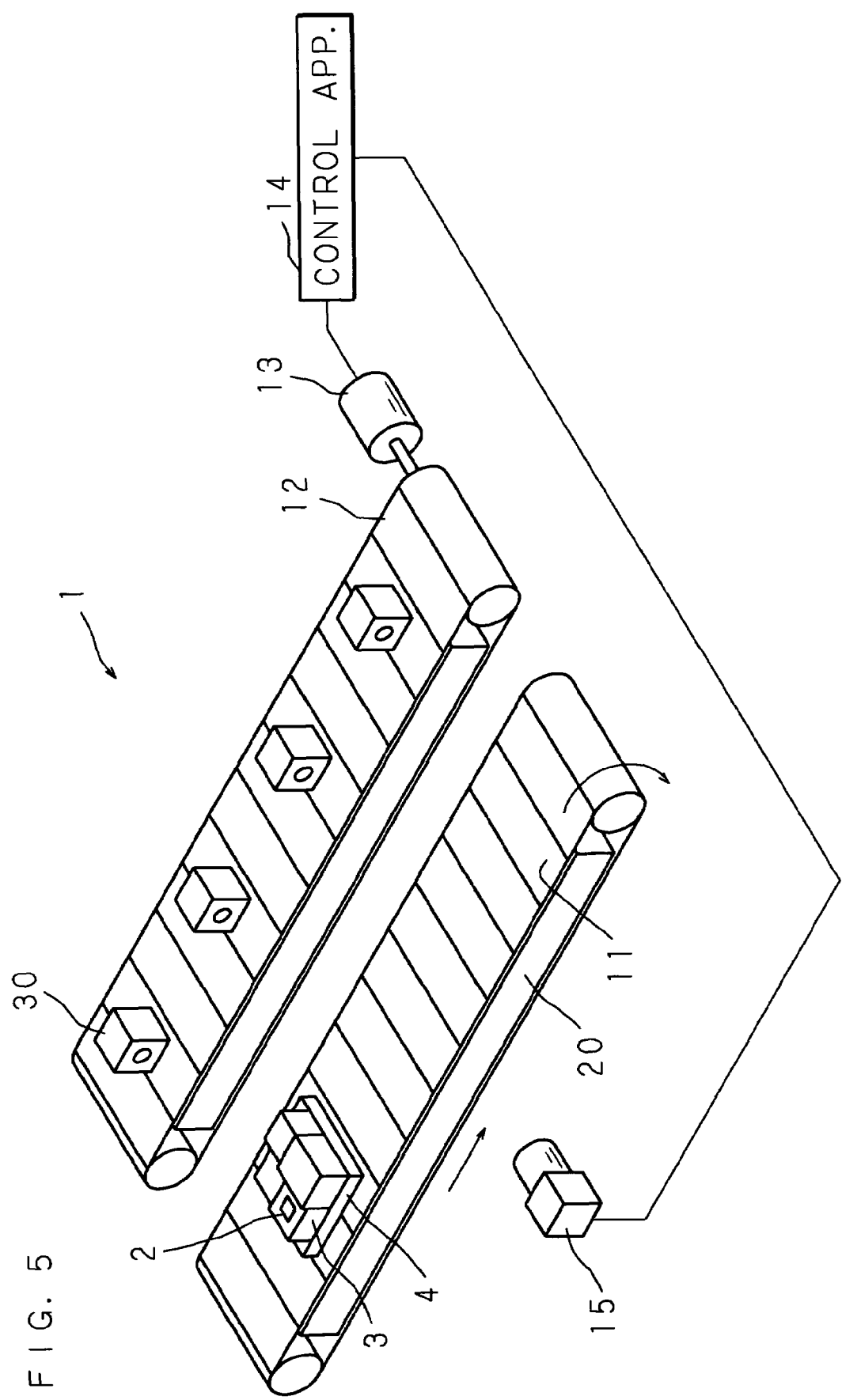
FIG. 5 is a schematic view showing a configuration of an RFID reading system according to Embodiment 2 of the present invention.

FIG. 5 is a schematic view showing a configuration of an RFID reading system according to Embodiment 2 of the present invention. In FIG. 5, the RFID reading system according to Embodiment 2 is different from that according to Embodiment 1 in that an image pick-up device 15 is provided.

In general, the weight measuring device 20 is configured by disposing a plurality of sensors substantially at equal intervals. Therefore, in a case such as when the trays 4 where the goods 3 are placed are conveyed in a state of being close to each other, there can be a case where it is difficult to accurately identify the space where the information stored in the RFID medium 2 to be read is readable. Accordingly, an image pick-up device capable of picking up an image of the first conveyor 11 is disposed on the side opposite to the second conveyor 12, and based on the picked up image, the presence positions where the goods 3 are possibly present are identified in a range further limited than the range identified based on the weight distribution detected by the weight measuring device 20. Since the remaining configuration of the control apparatus 14 is similar to that of Embodiment 1, the same reference numerals are assigned and a detailed description thereof is omitted.

Figure 6:
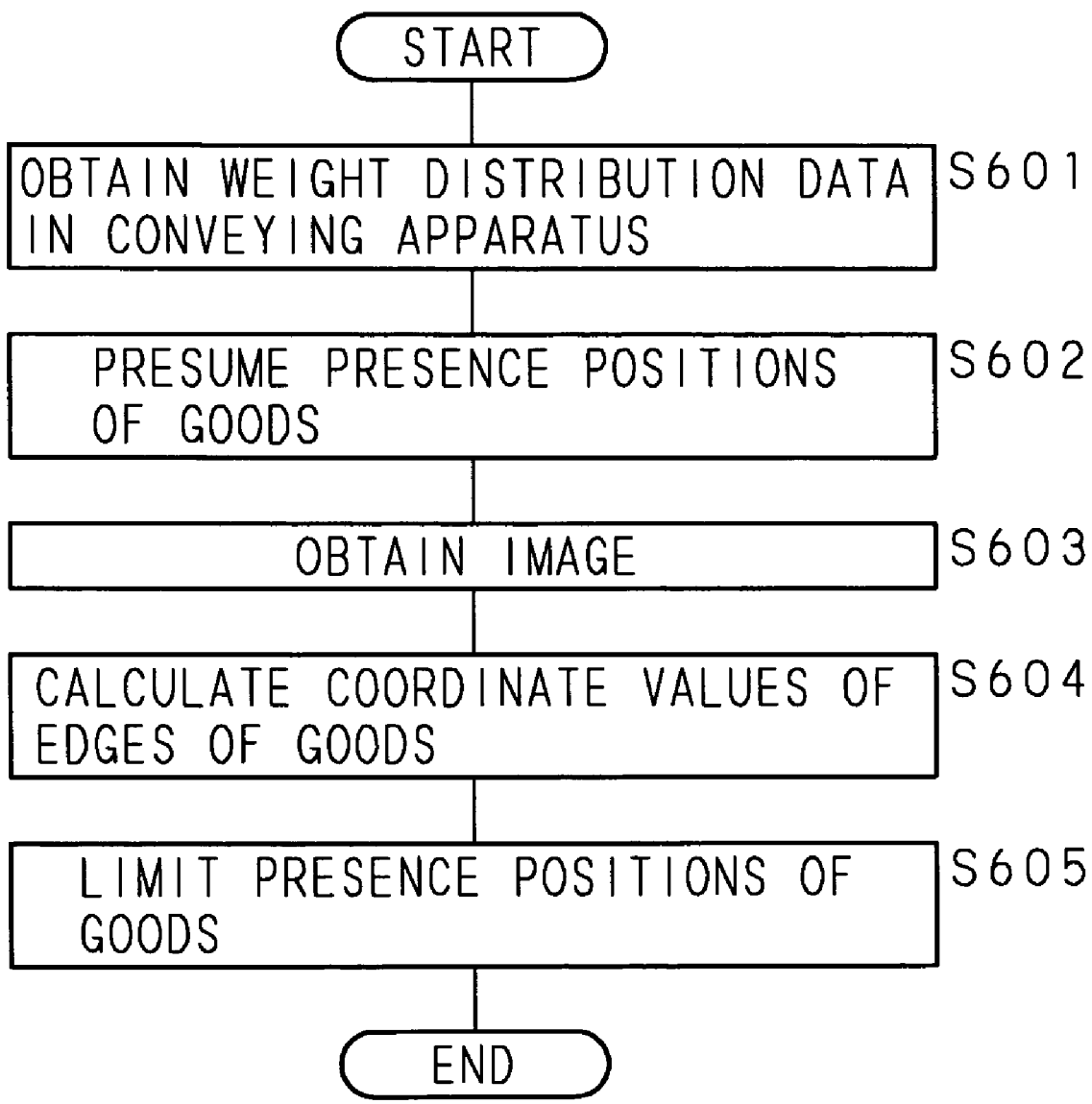
FIG. 6 is a flowchart showing a procedure of a limiting process of the presence positions of the goods by the CPU of the control apparatus of the RFID reading system according to Embodiment 2 of the present invention.

FIG. 6 is a flowchart showing a procedure of a limiting process of the presence positions of the goods by the CPU 141 of the control apparatus 14 of the RFID reading system according to Embodiment 2 of the present invention.

The CPU 141 of the control apparatus 14 obtains the weight distribution data in the conveying apparatus 1 based on the weights detected by the weight measuring device 20 functioning as the presence detecting sensor (step S601). The CPU 141 presumes the presence positions of the goods 3 based on the obtained weight distribution data (step S602). Specifically, similarly to Embodiment 1, the average value W0 of the weight distribution data is calculated, and the portions of the weights larger than the average value W0 are presumed to be the presence positions of the goods 3. It is to be noted that the present invention is not limited to the average value W0 and any method may be adopted that is capable of presuming the positions where the goods 3 are likely present.

FIG. 7 is an explanatory view of the method to limit the presence positions of the goods in the RFID reading system according to Embodiment 2. In the example shown in FIG. 7, it is presumed that the goods 3 are present between the coordinate values x1 and x2 and between the coordinate values x3 and x4 with the conveyance start position of the first conveyor 11 as the origin.

The CPU 141 obtains from the image pick-up device 15 the picked up images of the goods 3 conveyed on the first conveyor 11 (step S603), and calculates the coordinate values of edges on both sides of the goods 3 (step S604). That is, with the conveyance start position of the first conveyor 11 as the origin, the CPU 141 extracts the edges, in the vertical (longitudinal) direction, of the goods 3 or the trays 4 from the image, and calculates the coordinate values of positions where the extracted edges are present. In the example shown in FIG. 7, the positions where the edges extracted from the obtained image are present are the coordinate values x5, x6, x7 and x8, and it is presumed that the positions where the goods 3 are present are between the coordinate values x5 and x6 and between the coordinate values x7 and x8.

The CPU 141 compares the presence positions of the goods 3 presumed based on the weight distribution data with the presence positions of the goods 3 presumed based on the picked up image, and limits the presence positions of the goods 3 to the narrower ones of them (step S605).

Figure 8:
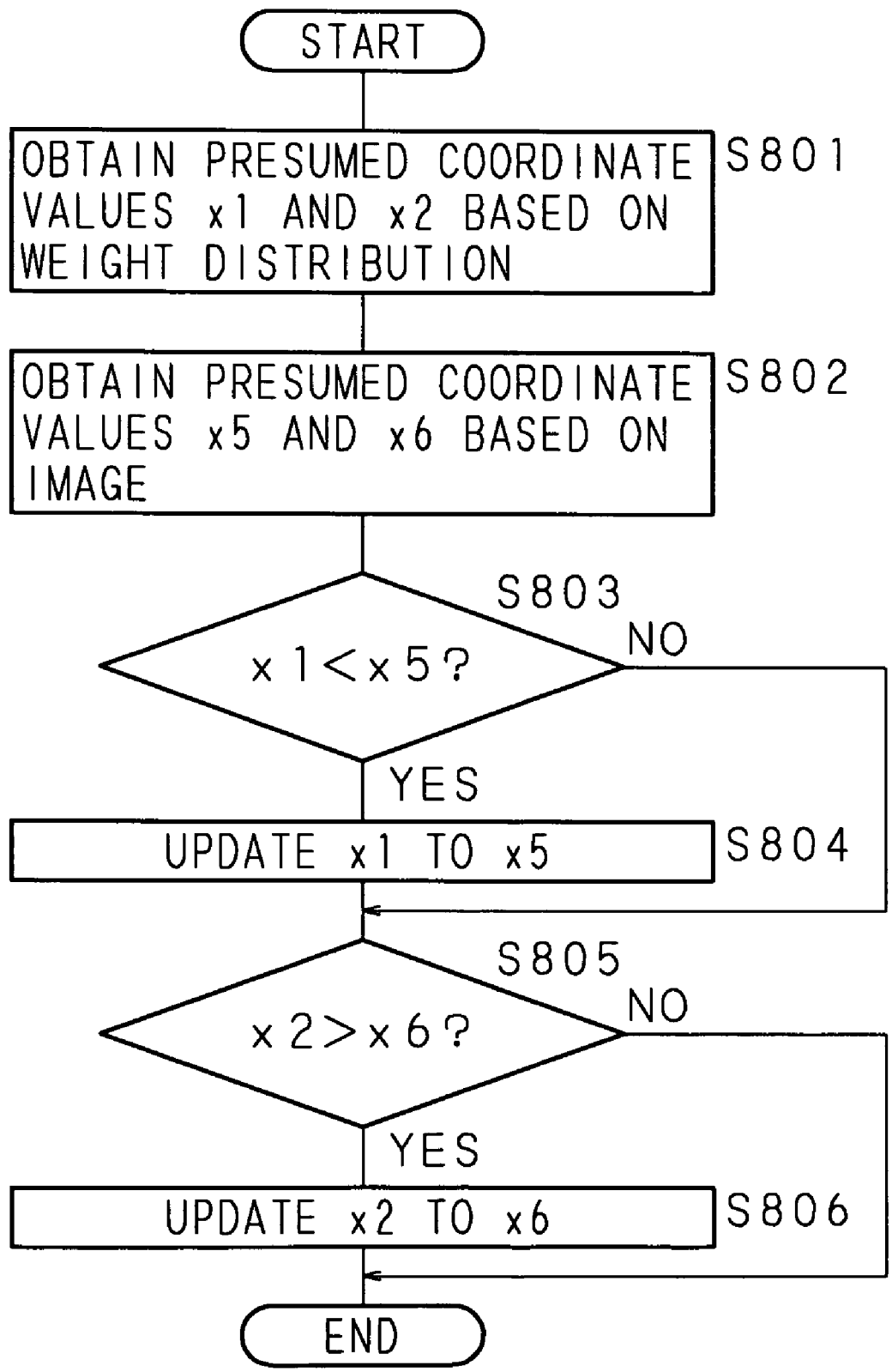
FIG. 8 is a flowchart showing a procedure of a comparison process of the presence positions of the goods by the CPU of the control apparatus.

FIG. 8 is a flowchart showing a procedure of a comparison process of the presence positions of the goods based on the example shown in FIG. 7 by the CPU 141 of the control apparatus 14. In FIG. 8, a case will be described where the position of the goods 3 present between the coordinates x1 and x2 is limited.

The CPU 141 first obtains the presumed coordinate values x1 and x2 (x1<x2) based on the weight distribution as the initial presence position of the goods 3 (step S801). Then, the CPU 141 also obtains the presumed coordinate values x5 and x6 (x5<x6) based on the image (step S802).

Next, the CPU 141 determines whether x1 is smaller than x5 or not (step S803). When it is determined that x1 is smaller than x5 (step S803: YES), the CPU 141 updates the coordinate value of one end of the goods 3 from x1 to x5 (step S804) by giving higher priority to the coordinate value where the edge extracted based on the image is present. When it is determined that x1 is equal to or larger than x5 (step S803: NO), the CPU 141 determines that the edge extracted based on the image is a noise, and does not update the coordinate value x1 of one end of the goods 3.

Next, the CPU 141 determines whether x2 is larger than x6 or not (step S805). When it is determined that x2 is larger than x6 (step S805: YES), the CPU 141 updates the coordinate value of one end of the goods 3 from x2 to x6 (step S806) by giving higher priority to the coordinate value where the edge extracted based on the image is present. When it is determined that x2 is equal to or smaller than x6 (step S805: NO), the CPU 141 determines that the edge extracted based on the image is a noise, and does not update the coordinate value x2 of one end of the goods 3.

By repetitively performing the above-described processing for each goods 3, the position where the goods 3 is present can be more accurately limited. Therefore, by performing control similar to that of Embodiment 1 according to the movement of the reader/writer 30, the reader/writer 30 can be accurately moved to the position opposed to the RFID medium 2 provided to the goods 3.

While the positions where the goods 3 are present are limited based on the image picked up by the image pick-up device 15 in Embodiment 2, the method to limit the positions where the goods 3 are present is not limited thereto. Similar effects are obtained, for example, when the positions where the goods 3 are present are limited by a combination of a radar apparatus, an ultrasonic apparatus and the like instead of the image pick-up device 15.

While the image pick-up device 15 is used to further limit the identified range based on the weight distribution detected by the weight measuring device 20 in Embodiment 2. However, in a case such as when the trays 4 on which the goods 3 are placed are conveyed in a state of being close to each other, the positions where the goods 3 are present may be identified by using only a presence detection sensor such as the image pick-up device 15, a radar apparatus or an ultrasonic apparatus without using the weight measuring device 20. Similar effects are expected in this case.

EMBODIMENT 3

Figure 9:
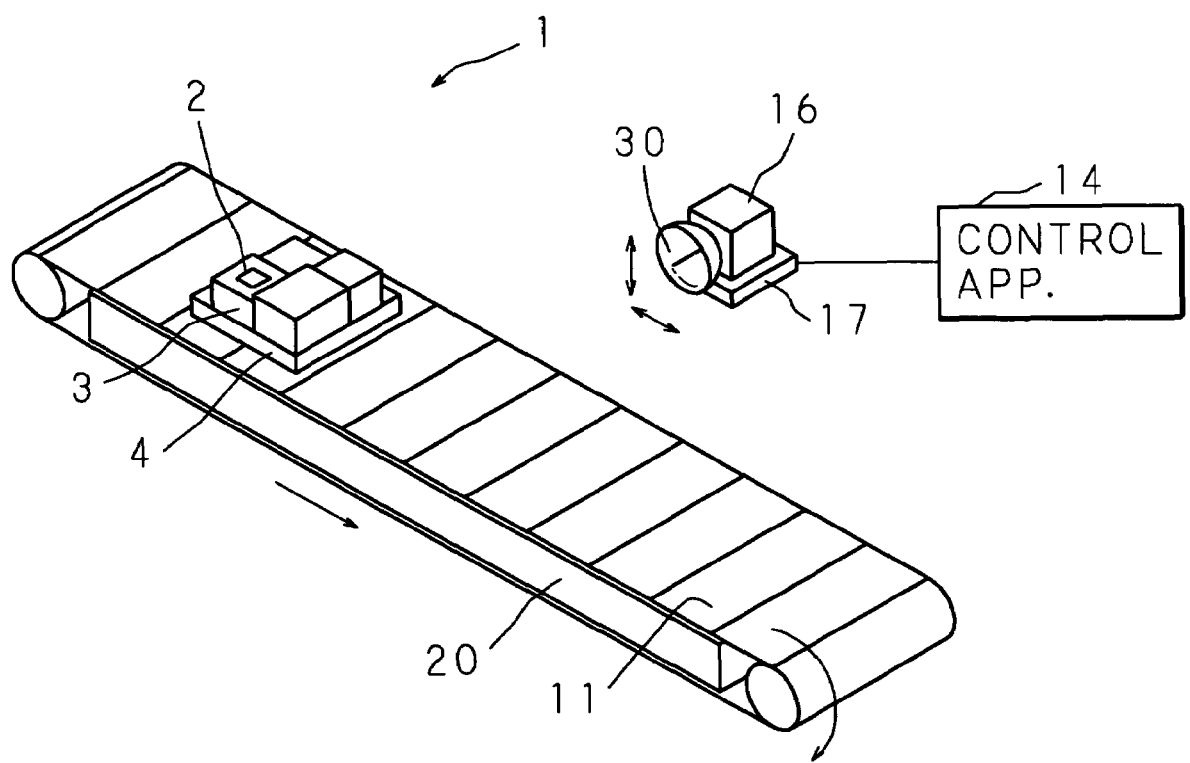
FIG. 9 is a schematic view showing a configuration of an RFID reading system according to Embodiment 3 of the present invention.

FIG. 9 is a schematic view showing a configuration of an RFID reading system according to Embodiment 3 of the present invention.

As shown in FIG. 9, the RFID reading system according to Embodiment 3 is not provided with the second conveyor 12. The reader/writer 30 of the RFID reading system according to Embodiment 3 has directivity, and although it can read the information stored in the RFID medium 2 present in a predetermined direction (the direction of the directivity), it cannot read the information stored in the RFID medium 2 present out of the direction of the directivity. Embodiment 3 is different from Embodiment 1 in that the reader/writer 30 is supported by a swinging mechanism 16 capable of swinging the reader/writer 30 in the vertical direction and the conveyance direction of the goods 3 and that the operation of an actuator 17 of the swinging mechanism 16 is controlled by the control apparatus 14.

That is, in the conveying apparatus 1, the swinging mechanism 16 capable of orientating the reader/writer 30 toward the goods 3 conveyed on the first conveyor 11 is provided on one side of the first conveyor 11. The reader/writer 30 can detect whether a predetermined goods is conveyed or not by performing data communication with the RFID media 2 provided to the goods 3 being conveyed on the first conveyor 11. When the reader/writer 30 detects the presence of the RFID medium 2 provided to the predetermined goods, the reader/writer 30 transmits a signal representing that the RFID medium 2 is detected, to the control apparatus 14 that controls the operation of the actuator 17 of the swinging mechanism 16, for example, by a communication cable.

The control apparatus 14 previously obtains the information for identifying the goods convened onto the first conveyor 11, from an external computer such as a computer that manages data of an inspection system, a quality control system or the like. Then, the control apparatus 14 determines whether the goods (goods to be conveyed) identified based on the previously obtained information is conveyed onto the first conveyor 11 or not based on the signal received from the reader/writer 30. When the goods to be conveyed is not detected, the control apparatus 14 transmits a signal to provide an instruction to rotate the swinging mechanism 16, to the actuator 17 so that the reader/writer 30 is orientated toward the goods 3 for a predetermined time. Since the remaining configuration of the control apparatus 14 is similar to that of Embodiment 1, the same reference numerals are assigned and a detailed description thereof is omitted.

Figure 10:
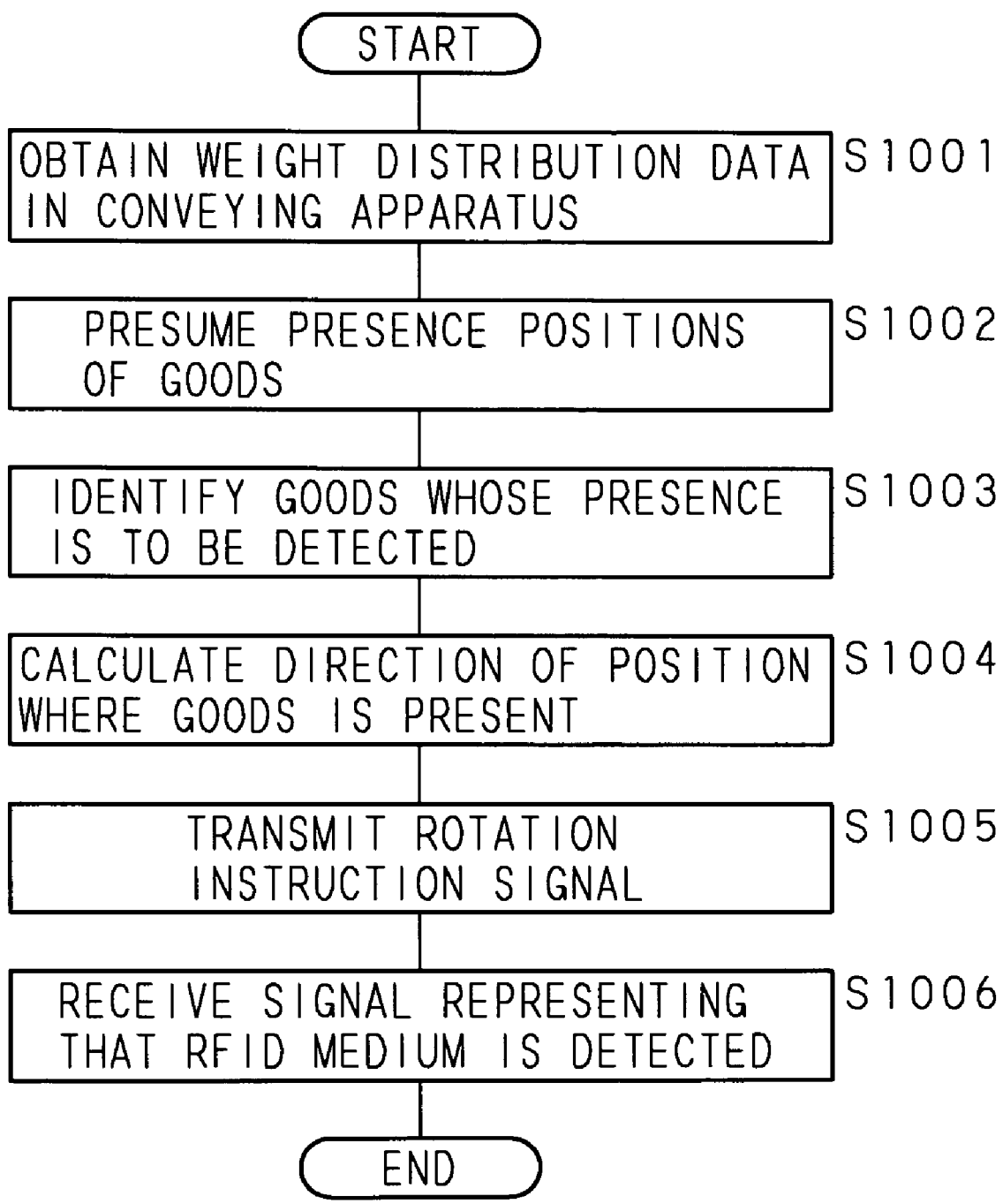
FIG. 10 is a flowchart showing a processing procedure of the CPU of the control apparatus of the RFID reading system according to Embodiment 3 of the present invention.

FIG. 10 is a flowchart showing a processing procedure of the CPU 141 of the control apparatus 14 of the RFID reading system according to Embodiment 3 of the present invention.

The CPU 141 of the control apparatus 14 obtains the weight distribution data in the conveying apparatus 1 based on the weights detected by the weight measuring device 20 functioning as the presence detecting sensor (step S1001). Specifically, with the goods conveyance start position of the first conveyor 11 as the origin, the weight distribution data to the goods conveyance end position is obtained.

The CPU 141 presumes the presence positions of the goods 3 based on the obtained weight distribution data (step S1002). Specifically, the average value W0 of the weight distribution data shown in FIG. 4 is calculated, and the portions of the weights larger than the average value W0 are presumed to be the presence positions of the goods 3. It is to be noted that the present invention is not limited to the average value W0 and any method may be adopted that is capable of presuming the positions where the goods 3 are likely present.

The CPU 141 identifies the goods 3 whose presence is to be detected (step S303), calculates the direction, from the reader/writer 30, of the position where the goods 3 to be detected is present (step S1004), and transmits the rotation instruction signal to the actuator 17 of the swinging mechanism 16 so that the reader/writer 30 is orientated in the calculated direction (step S1005). The CPU 141 receives from the reader/writer 30 the signal representing that the RFID medium 2 is detected (step S1006).

The method to identify the rotation speed, the rotation direction and the like of the reader/writer 30 by the CPU 141 is not specifically limited. For example, the rotation speed, the rotation direction and the like of the reader/writer 30 are changed along the direction in which the goods 3 are conveyed by the first conveyor 11. At the same time, the reader/writer 30 can be vertically rotated according to the position where the RFID medium 2 is provided, specifically, according to the reception intensity of the signal transmitted from the RFID medium 2 and received by the reader/writer 30.

In the conventional RFID reading system, it is necessary to move the reader/writer 30 in synchronism with the conveyance speed of the goods. However, in Embodiment 3, as described above, only one reader/writer 30 is necessarily provided, and the reader/writer 30 can be orientated in a direction where it can perform data communication with the RFID medium 2 by changing the direction of the reader/writer 30 according to the reception directivity of the reader/writer 30. Therefore, it is unnecessary to move the reader/writer 30 at the same speed as the goods conveyance speed as long as the reader/writer 30 is orientated in the direction where it can perform data communication with the RFID medium 2.

The CPU 141 determines whether the reading of the RFID media 2 is completed or not. The method to determine whether the reading of the RFID media 2 is completed or not is not specifically limited, either. For example, whether the reading of the RFID media 2 is finished or not may be determined by obtaining the information on the number of RFID media 2 storing the information to be read by the reader/writer 30, from an inspection management computer of the goods 3 placed exterior and determining whether a predetermined number of pieces of detection information are read from the RFID media 2 by the reader/writer 30 or not. It is to be noted that the identification information of the RFID media 2 to be present may be previously obtained so that the determination is made based on whether the identification information is read or not.

As described above, according to Embodiment 3, it is necessary only that the reader/writer 30 be orientated in a direction where the information stored in the RFID medium 2 to be read is readable for a predetermined time, and, at the point of time when the information is read, the reader/writer 30 can be rotated in the direction where the information stored in the next RFID medium 2 is readable. Consequently, the information stored in the RFID medium 2 can be reliably read without the need to provide the reader/writer 30 for each of the RFID media 2 provided to the goods 3 to be conveyed. Moreover, when the information stored in the RFID medium 2 is read, the shift to the reading of the information stored in the next RFID medium 2 can be immediately made. Consequently, it is unnecessary to uselessly rotate the reader/writer 30 and the power consumption involved in the rotation of the reader/writer 30 can be reduced.

It is to be noted that in Embodiment 3, like in Embodiment 2, the positions where the goods 3 are present can be more accurately identified by also using an image pick-up device, a radar apparatus, an ultrasonic apparatus or the like. Consequently, the reader/writer 30 can be accurately rotated to a direction where a signal can be received from the RFID medium 2 provided to the goods 3.

Moreover, also in Embodiment 3, in a case such as when the trays 4 on which the goods 3 are placed are conveyed in a state of being close to each other, the positions where the goods 3 are present may be identified by using only a presence detection sensor such as the image pick-up device 15, a radar apparatus, an ultrasonic apparatus or the like without using the weight measuring device 20. Similar effects are expected in this case.

OTHER EMBODIMENTS

Figure 11A:
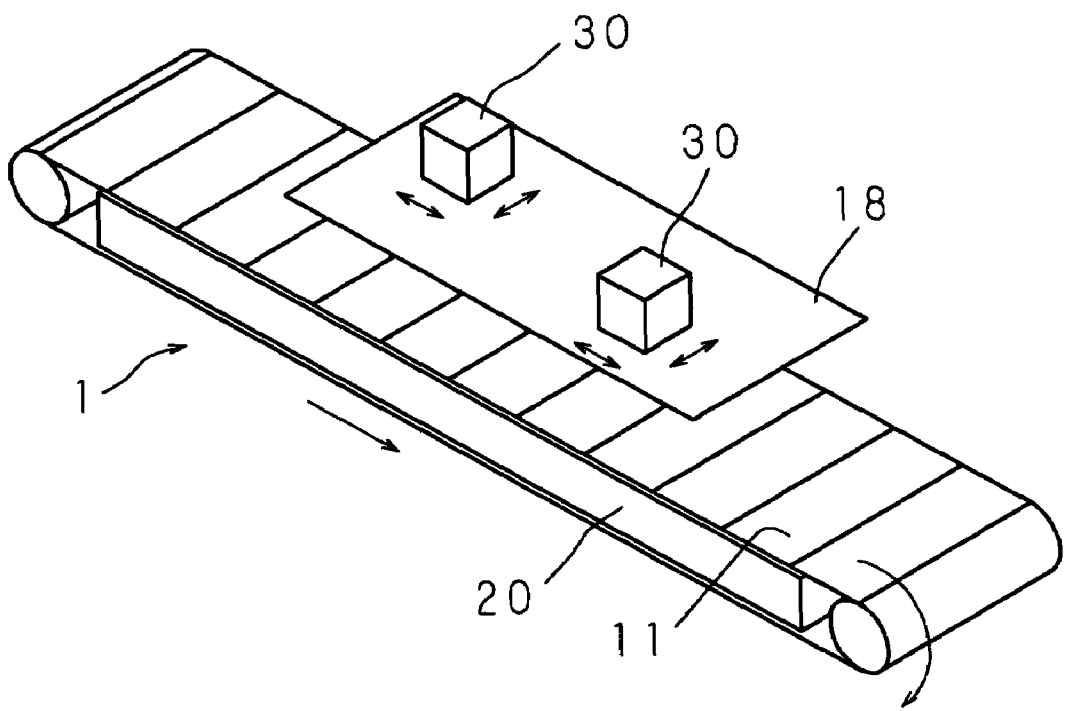
FIG. 11A and FIG. 11B are schematic views of RFID reading systems according to another embodiment.
Figure 11B:
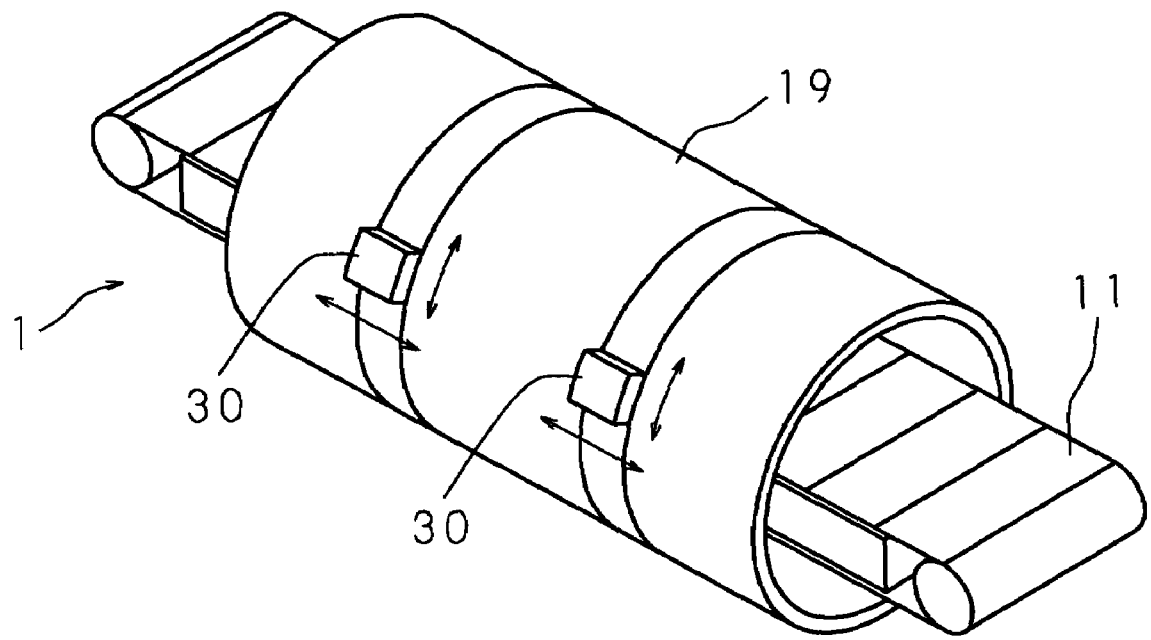

The method to move the reader/writer 30 is not limited to the methods disclosed in the above-described Embodiments 1 to 3. FIG. 11A and FIG. 11B are schematic views showing configurations of RFID reading systems according to other embodiments.

FIG. 11A is a schematic view showing an example of a system configuration that is possible when it has previously known that the heights of all the goods to be conveyed are smaller than a predetermined height. In the case of such a premise, a plate 18 is provided in a position at a predetermined height from the first conveyor 11, specifically, in a position higher than the surface of the first conveyor 11 by the predetermined height. On the upper surface of the plate 18, the readers/writers 30 travelable by themselves are disposed. In this case, since the goods 3 are conveyed between the lower surface of the plate 18 and the surface of the first conveyor 11, similar effects as above mentioned embodiments are obtained by the readers/writers 30 traveling by themselves on the plate 18 in accordance with the movement of the goods 3.

FIG. 11B is a schematic view showing an example of a system configuration that is possible when it has previously known that the shapes of the goods to be conveyed are substantially the same. In the case of such a premise, the first conveyor 11 is covered with a tubular body 19, and the readers/writers 30 are attached that are travelable on the periphery surface of the tubular body 19 in the circumferential direction and in the conveyance direction. In this case, since the goods 3 are conveyed inside the tubular body 19, similar effects as above mentioned embodiments are obtained by the readers/writers 30 traveling by themselves on the periphery surface of the tubular body 19 in accordance with the movement of the goods 3.

As described above, the RFID medium 2 can be reliably detected by making the readers/writers 30 travel to a position in a space where the information stored in the RFID medium 2 is readable.

As described above in detail, according to the first and the second aspects of the present invention, the reader stays only for the predetermined time in the space where the reader can read the information stored in the RFID to be read, and, at the point of time when the information is read, can move to the space where the reader can read the information stored in the next RFID. Consequently, the information stored in the RFID can be reliably read without the need to provide the reader for each RFID to be conveyed. Moreover, when the information stored in the RFID is read, the reader can immediately shift to the reading of the information stored in the next RFID. Consequently, it is unnecessary to uselessly make the reader and the power consumption involved in the movement of the reader can be reduced.

Moreover, according to the third aspect of the present invention, by swinging the reader, the direction of the directivity of the reader can be set, for the predetermined time, to the direction where the information stored in the RFID to be read is readable. For this reason, at the point of time when the information is read, the orientation of the reader can be changed to the direction where the information stored in the next RFID is readable. Consequently, the information stored in the RFID can be reliably read without the need to provide the reader for each RFID to be conveyed. Moreover, when the information stored in the RFID is read, the shift to the reading of the information stored in the next RFID can be immediately made. Consequently, since it is unnecessary to uselessly swing the reader, the power consumption involved in the swinging of the reader can be reduced.

Further, according to the fourth aspect of the invention, since the presumed presence position of the goods is further limited based on the image of the conveyance state of the goods picked up by the image pick-up device, the information stored in the RFID can be more reliably read.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. An RFID reading method for reading information stored in an RFID by a reader that is provided so as to be movable, and reads, in a noncontact manner, information stored in the RFID provided to a goods conveyed by a conveying apparatus, said method comprising the steps of:

presuming a presence position, where the goods is present, on said conveying apparatus based on a detection value of a presence detection sensor that detects presence of the goods conveyed by said conveying apparatus; and controlling a movement of said reader so that the reader stays, for a predetermined time, in a space where said reader can read the information from the RFID that is present in the presumed presence position.

2. The RFID reading method as set forth in claim 1, wherein in the step of controlling the movement of said reader, said reader is moved in a conveyance direction of the goods so as to stay, for the predetermined time, in the space where said reader can read the information from the RFID that is present in said presence position.

3. The RFID reading method as set forth in claim 2, further comprising the step of limiting said presumed presence position based on an image picked up by an image pick-up device that picks up an image of a conveyance state of the goods.

4. An RFID reading method for reading information stored in an RFID by a reader that is provided so as to be swingable in a vertical direction and/or a conveyance direction of the goods, and reads, in a noncontact manner, information stored in the RFID provided to a goods conveyed by a conveying apparatus, wherein said reader has directivity in information reading, said method comprising the steps of:

presuming a presence position, where the goods is present, on said conveying apparatus based on a detection value of a presence detection sensor that detects presence of the goods conveyed by said conveying apparatus; and controlling swinging of said reader so that a direction of the directivity of said reader is orientated, for a predetermined time, in a direction where said reader can read the information from the RFID present in said presumed presence position.

5. The RFID reading method as set forth in claim 4, further comprising the step of limiting said presumed presence position based on an image picked up by an image pick-up device that picks up an image of a conveyance state of the goods.

6. An RFID reading system that reads information stored in an RFID provided to a goods conveyed by a conveying apparatus and from which information is readable in a noncontact manner, said system including:

a presence detection sensor that detects presence of the goods being conveyed by said conveying apparatus;

a reader that reads the information stored in the RFID in the noncontact manner;

a moving apparatus that moves said reader; and a control apparatus that controls an operation of said moving apparatus;

wherein said control apparatus comprises:

position presuming means for presuming a presence position where the goods is present, based on a detection value of said presence detection sensor; and means for transmitting a signal to control the operation of said moving apparatus so that said reader stays, for a predetermined time, in a space where said reader can read the information from the RFID that is present in the presence position presumed by said position presuming means.

7. The RFID reading system as set forth in claim 6, wherein said moving apparatus moves said reader in a conveyance direction of the goods, and said control apparatus transmits a signal to move said moving apparatus in the conveyance direction of the goods so that said reader stays, for the predetermined time, in the space where said reader can read the information from the RFID that is present in said presence position.

8. The RFID reading system as set forth in claim 7, further including:
an image pick-up device that picks up an image of a conveyance state of the goods; and
means for limiting said presence position presumed by said position presuming means, based on the image picked up by said image pick-up device.

9. An RFID reading system that reads information stored in an RFID provided to a goods conveyed by a conveying apparatus and from which information is readable in a noncontact manner, said system including:
a presence detection sensor that detects presence of the goods being conveyed by said conveying apparatus;
a reader that reads the information stored in the RFID in the noncontact manner;
a swinging mechanism that swings said reader in a vertical direction and/or a conveyance direction of the goods; and
a control apparatus that controls an operation of said swinging mechanism,
wherein
said reader has directivity in information reading, and
said control apparatus comprises: position presuming means for presuming a presence position where the goods is present, based on a detection value of said presence detection sensor; and means for transmitting a signal to control the operation of said swinging mechanism so that a direction of said directivity of said reader is orientated, for a predetermined time, in a direction where said reader can read the information from the RFID that is present in said presence position presumed by said position presuming means.

10. The RFID reading system as set forth in claim 9, further including:
an image pick-up device that picks up an image of a conveyance state of the goods; and
means for limiting said presence position presumed by said position presuming means, based on the image picked up by said image pick-up device.

11. A control apparatus that controls reading of information stored in an RFID provided to a goods conveyed substantially at a constant speed on a conveying apparatus and from which information is readable in a noncontact manner, said control apparatus comprising:
position presuming means for presuming a presence position where the goods is present, based on a detection value of a presence detection sensor that detects presence of the goods conveyed by said conveying apparatus; and
means for transmitting a signal to control an operation of a moving apparatus that moves said reader so that said reader stays, for a predetermined time, in a space where said reader can read the information from the RFID that is present in said presence position presumed by said position presuming means.

12. The control apparatus as set forth in claim 11, wherein said moving apparatus moves said reader in a conveyance direction of the goods, and
said control apparatus transmits a signal to move said moving apparatus in the conveyance direction of the goods so that said reader stays, for the predetermined time, in the space where said reader can read the information from the RFID that is present in said presence position.

13. The control apparatus as set forth in claim 12, further comprising means for limiting said presence position presumed by said position presuming means, based on an image picked up by an image pick-up device that picks up an image of a conveyance state of the goods.

14. A control apparatus that controls reading of information stored in an RFID provided to a goods conveyed substantially at a constant speed on a conveying apparatus and from which information is readable in a noncontact manner, said control apparatus comprising:
means for presuming a presence position where the goods is present, based on a detection value of a presence detection sensor that detects presence of the goods conveyed by said conveying apparatus; and
position presuming means for transmitting a signal to control an operation of a swinging mechanism that swings a reader, having directivity in information reading, in a vertical direction and/or a conveyance direction of the goods so that a direction of the directivity of said reader is orientated, for a predetermined time, in a direction where said reader can read the information from the RFID that is present in said presence position presumed by said position presuming means.

15. The control apparatus as set forth in claim 14, further comprising means for limiting said presence position presumed by said position presuming means, based on an image picked up by an image pick-up device that picks up an image of a conveyance state of the goods.

16. A computer program product for controlling a computer so as to read, by using a reader, information stored in an RFID provided to a goods conveyed substantially at a constant speed on a conveying apparatus and from which information is readable in a noncontact manner, wherein the computer program product comprises:
a computer readable storage medium having computer readable program code means embodied in said medium, said computer readable program code means comprising the computer instruction means for:
presuming a presence position, where the goods is present, on said conveying apparatus, based on a detection value of a presence detection sensor that detects presence of the goods conveyed by said conveying apparatus; and
transmitting a signal to control an operation of a moving apparatus that moves said reader so that said reader stays, for a predetermined time, in a space where said reader can read the information from the RFID that is present in said presumed presence position.

17. The computer program product as set forth in claim 16, wherein
said moving apparatus moves said reader in the conveyance direction of the goods, and
said signal provides an instruction to move said moving apparatus in the conveyance direction of the goods so that said reader stays, for a predetermined time, in the space where said reader can read the information from the RFID that is present in said presence position.

18. The computer program product as set forth in claim 17, wherein said computer readable program code means further comprises the computer instruction means for limiting said presumed presence position based on an image picked up by an image pick-up device that picks up an image of a conveyance state of the goods.

19. A computer program product for controlling a computer to read, by using a reader having directivity in information reading, information stored in an RFID provided to a goods conveyed substantially at a constant speed on a conveying apparatus, from which information is readable in a noncontact manner, wherein the computer program product comprises:

a computer readable storage medium having computer readable program code means embodied in said medium, said computer readable program code means comprising the computer instruction means for:

presuming a presence position, where the goods is present, on said conveying apparatus, based on a detection value of a presence detection sensor that detects presence of the goods conveyed by said conveying apparatus; and transmitting a signal to control an operation of a swinging mechanism that swings said reader in a vertical direction and/or a conveyance direction of the goods so that a direction of the directivity of said reader is orientated, for a predetermined time, in a direction where said reader can read the information from the RFID that is present in said presumed presence position.

20. The computer program product as set forth in claim 19, wherein said computer readable program code means further comprises the computer instruction means for limiting said presumed presence position based on an image picked up by an image pick-up device that picks up an image of a conveyance state of the goods.

* * * * *